May 22, 1945.　　　N. A. THOMPSON　　　2,376,834
AIRCRAFT
Filed Oct. 6, 1942　　　4 Sheets-Sheet 3

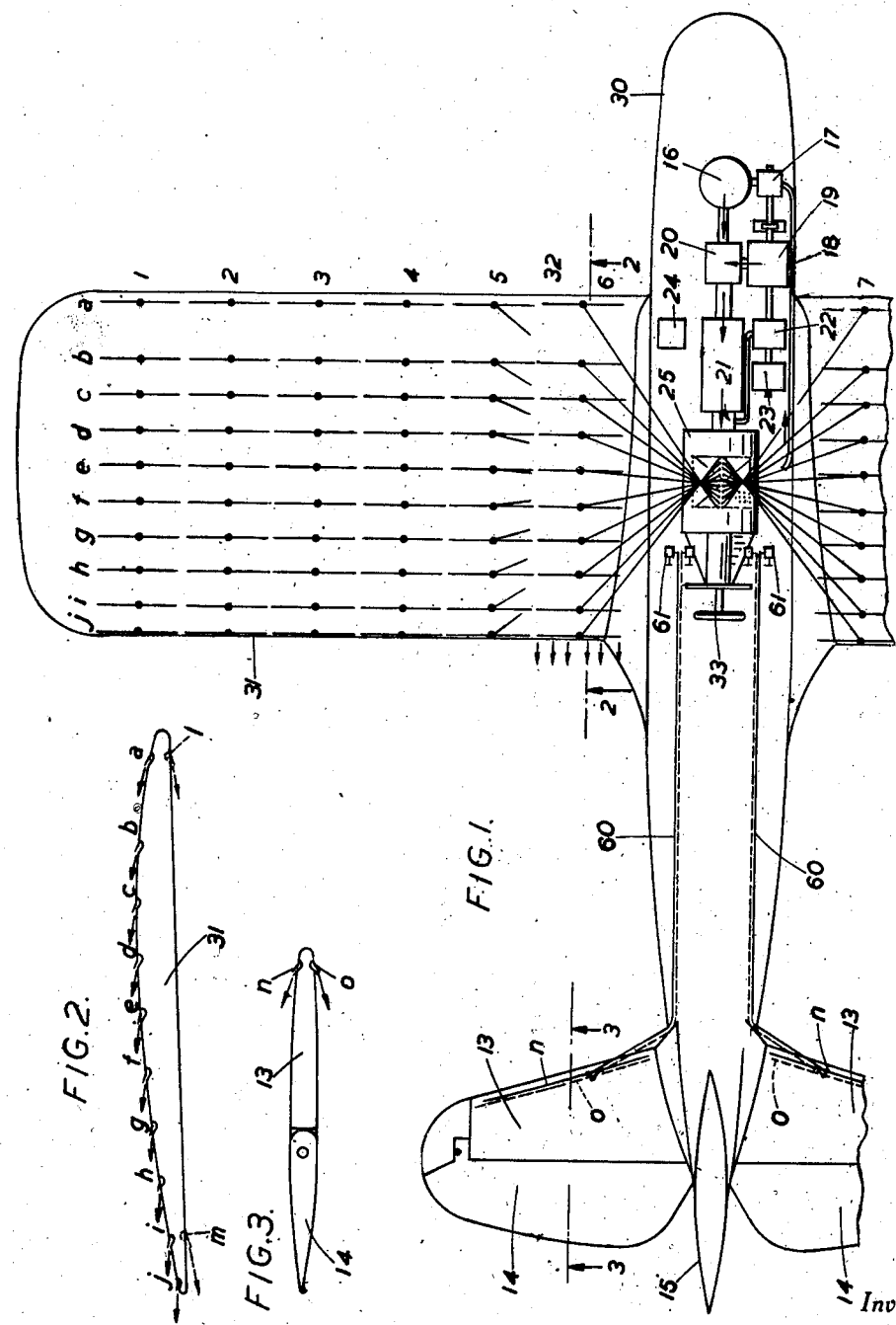

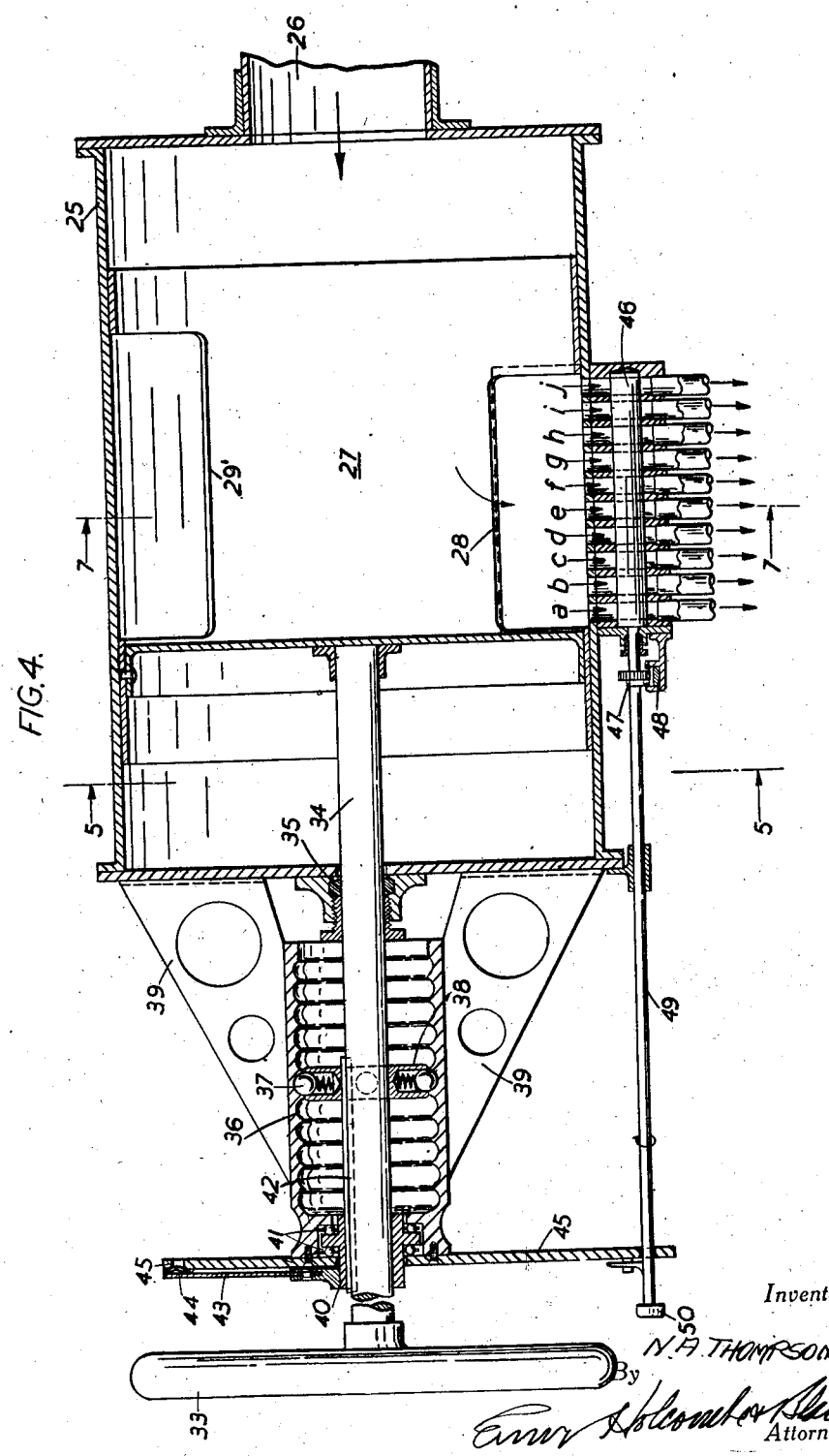

Inventor
N.A.THOMPSON
By
Attorneys

May 22, 1945.  N. A. THOMPSON  2,376,834
AIRCRAFT
Filed Oct. 6, 1942  4 Sheets-Sheet 4
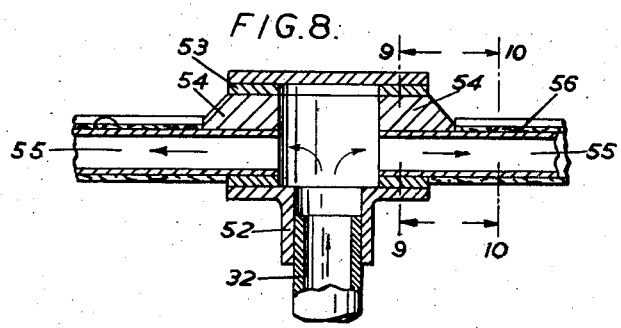
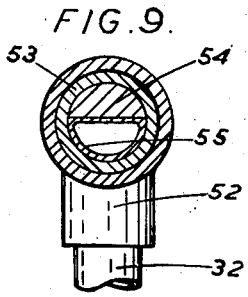
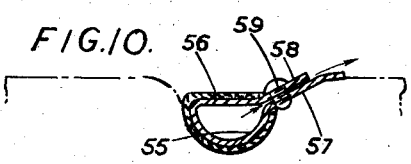
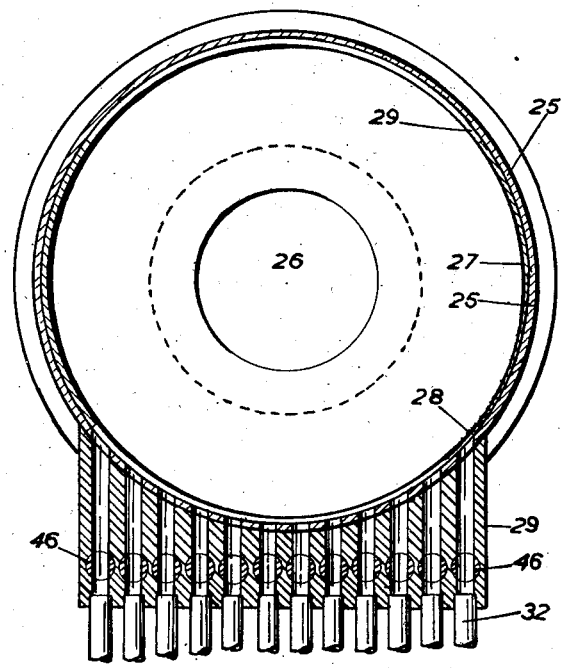
Inventor
N.A. THOMPSON.
By
Emery Holcombe & Blair
Attorneys Patented May 22, 1945

2,376,834

UNITED STATES PATENT OFFICE 2,376,834

AIRCRAFT

Norman Arthur Thompson, London, S. W. 1, England

Application October 6, 1942, Serial No. 460,995
In Great Britain October 13, 1941

2 Claims. (Cl. 244—12)

This invention relates to the propulsion of aircraft, more particularly of the heavier-than-air type, and it has in view the use of very thin layers of fluid issuing at high velocity from narrow slits for producing the required thrust against the surrounding atmosphere. Propulsion by this method may be described for convenience as that of "sheet-jet propulsion," and, where the velocity of exit of the fluid is very high, as "supersonic sheet-jet propulsion."

The present invention relates more particularly to methods of utilising the variation of thrust, either in direction or in intensity or both, as a means of controlling and stabilising the aircraft, independently of the usual tailplane elevators, rudder and ailerons, so as, in some cases, to render the use thereof, or even the inclusion of one or more of them in the structure of the aircraft, unnecessary.

The wings or other surfaces of the aircraft are provided with a number of tubes or channels disposed transversely to the direction of flight and provided with narrow exit slits so formed and positioned that the resultant thrust is in the direction of flight. Of course some of the tubes or channels may be disposed so as to give a resultant thrust in other directions to influence lift or stability. It is preferable to arrange a number of such tubes or channels spaced apart and approximately parallel to each other along the surface of each wing from root to tip, their respective positions being chosen according to aerodynamic considerations. Other tubes or channels can be placed on or in other parts of the aircraft, with a view to eliminating edge resistance, either so as to reduce the accumulated pressure in front of a leading edge or to increase the diminished pressure behind a training edge.

The tubes or channels may be of D-section, with the flat surface in the surface of the wings, and with narrow exit slits preferably at or near the rear of the D-section where the curved profile may be extended to form a lip over which the fluid is discharged. Suitable means are provided, such as set-screws, for the fine adjustment of the exit openings.

While utilising the general arrangement of the fluid exit tubes to suit primarily the requirements of producing the propelling thrust, it is possible so to position the tubes, or some of them, relatively to the wing section, to each other, and to the angle which the ejected fluid makes with the line of flight, that they may also be used for controlling, or assisting in controlling, the angular movements of the aircraft about its centre of gravity in the three dimensions of space when in flight. The sheet-jet gas discharges not only produce thrust but, by the suction effect on the surrounding air, they also produce a lift on the upper surfaces of the wings to which they are applied.

The fluid, when ejected from the tubes at the requisite temperature, may also serve the purpose of de-icing or eliminating the tendency for ice formation.

Additional fluid exit tubes may be placed wherever required, either for de-icing at any desired point, or for the purpose of control, for example along the leading and trailing edges of the wings for fore-and-aft control, or along the wing-tip edges for lateral control, in each of which cases a maximum turning effort can be obtained about the centre of gravity of the aircraft. Steering in the horizontal plane, i.e. turning of the aircraft about its vertical axis, can be effected whether in the air or on the ground, by varying the number of thrust tubes in operation on either wing or the pressure of the fluid supplied thereto, so as to produce an inequality of thrust on either side of the central fore-and-aft axis of the aircraft. The control of the gases at the sheet-jets provides a method of controlling the aircraft by varying the pressure at any region in the airstream as it passes over a wing, and hence varying the lift effect.

If jets are used as described in the specification of British Patent No. 456,063 it is possible to bring into action an air-braking effect by raising the pressure at which the fluid is supplied to the exit tubes beyond a certain limit, when the suction effect ceases and, due to its increased momentum, the fluid sheet is projected more or less forwardly in the direction of flight, being no longer deflected backwards by adherence to the guiding surface at the rear of the line of exit. This phenomenon enables a braking control to be effected without the necessity for using separate jets directed reversely for that purpose.

On the assumption that it is a gas or mixture of gases supplied under pressure which is used for effecting the sheet-jet propulsion, the control of the motive gas supply to the different gas-exit tube lengths, or groups thereof, which form the gas-exit tube system, may be operated from a central point convenient to the pilot's hand, by means of a suitable device or mechanism. By way of example, each supply tube feeding an independent length of exit tube may be connected to a central distributing metallic chamber, to which the motive gas is supplied at the required pressure from the generating source. The chamber is cylindrical in form with its axis lying fore-and-aft in the aircraft and preferably heat-insulated. In the lower portion of the cylindrical wall holes are drilled corresponding in number with the supply tubes and positioned symmetrically in a curved rectangular area in rows parallel respectively with the fore-and-aft and transverse axes of the aircraft. The rows of holes parallel with the fore-and-aft axis correspond directly in order of position from port to starboard with the exit tube lengths they feed taken from port to starboard, whilst in the case of the holes in the rows parallel with the transverse axis the sequence of their position in regard to that of the exit tubes they feed is inverted, so as to maintain the customary movement for the fore-and-aft control of the aircraft.

Within the cylindrical chamber, and rotatable about its axis on a spindle, which projects through a stuffing box at one end to carry the control wheel, is mounted a thin cylinder of suitable metal, which acts as a valve, and out of which a rectangular hole is cut, which in the neutral position of the controlling device embraces, with such margin as may be desired, the curved rectangular area containing the gas distribution holes in the chamber. The angular and fore-and-aft movement of the control cylinder over suitably disposed gas delivery holes permits the necessary lateral and fore-and-aft control of the aircraft to be effected, as well as control of its horizontal course. The motive gas, or mixture of gases, is supplied through a pipe, or pipes, preferably connected to the circular end of the cylindrical chamber opposite to that where the control handwheel is mounted.

Cast with or secured to the chamber is a base, or block, rectangular in plan view, of a width covering the arc occupied by the gas delivery holes. These holes are drilled vertically through the block and parallel to each other. The base or block may carry cocks or valves controlled by spindles passing through glands to the outside of the valve box. The setting of these spindles, which lie fore-and-aft in the aircraft, provides a means of controlling the thrust intensity without displacing the centre of thrust in the horizontal plane.

The invention is illustrated by way of example in the accompanying drawings, wherein:

Figure 1 is a diagram showing a partial plan view of an aeroplane with the invention applied thereto;

Figure 2 shows a diagrammatic cross section of a wing taken on the line 2—2 of Figure 1;

Figure 3 shows a diagrammatic cross section of the tailplane taken on the line 3—3 of Figure 1;

Figure 4 shows a vertical section through the control unit;

Figure 7 shows a cross section on the line 7—7 of Figure 4;

Figure 8 is an enlarged detail view showing the ends of the jet tubes and their supply connection;

Figure 9 shows a section on the line 9—9 of Figure 8; and

Figure 10 shows a section on the line 10—10 of Figure 8.

Figure 5:
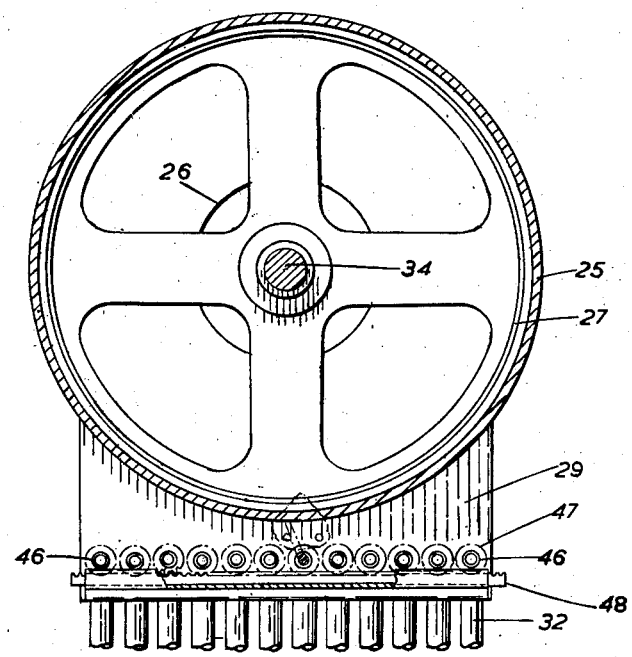
Figure 5 shows a cross section on the line 5—5 of Figure 4.

Referring first to Figures 1, 2 and 3, 30 represents the fuselage of an aeroplane with wings 31 and a tail section 13, provided with elevators 14. 15 is the rudder. In the fuselage is provided any suitable source of gas under pressure. In the example shown diagrammatically 16 is a vaporiser into which fuel is injected from a fuel pump 17 which also includes a filter. The fuel is delivered through a pipe 18 from suitable tanks in the wings. 19 represents an air pump and air filter, and 20 is a mixing chamber to which gas from the vaporiser and air from the air pump are delivered. The mixture passes to a combustion chamber 21 which maintains the supply of gas under pressure for the propulsion and control of the aircraft. 22 is a motor, which may be a turbine for example driven by gas under pressure from the chamber 21, for driving the air pump 19 and fuel pump 17, and 23 is an electric motor and generator set driven by current provided by the battery 24 for starting purposes, and generating current for recharging the battery when the motor 22 is running. 25 is the control chamber into which the pressure gas is delivered and from which it is distributed to the wings and other parts of the aeroplane. This chamber should be heat-insulated.

Figure 6:
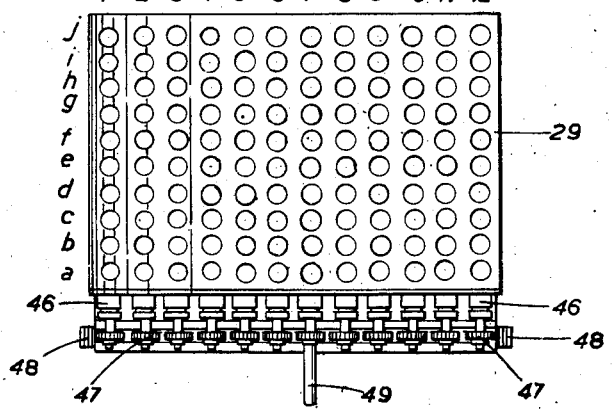
Figure 6 shows a plan view of the block containing the outlet passages.

The construction and arrangement of the control chamber and its outlets is illustrated in Figures 4 to 7, in which 26 is the inlet pipe from the combustion chamber 21, and 27 is a cylindrical valve member with a rectangular port 28 at the bottom and a large aperture 29' at the top, preferably larger in area than the port 28 so that there is a balance of pressure acting downwardly on the cylinder 27 keeping it pressed upon the lower surface of the control chamber 25. Beneath the port 28 is a set of openings lettered $a$ to $j$ in a direction from back to front and numbered from 1 to 12 transversely, as seen in the plan view of Figure 6. These openings extend downwardly through a block 29 and lead to pipes 32 communicating with the jet tubes in the wings 31. The pipes are crossed over from back to front as indicated diagrammatically in Figure 1, so that apertures in the rear row $a$ lead to jet tubes in the wing 31 nearest the front edge thereof, and apertures of front row $j$ in the block 29 are connected to jet tubes nearest the rear edge of the wing. The rows of jet tubes on the surface of the wing 31 are numbered 1 to 6 from the tip towards the fuselage to correspond with apertures in the fore-and-aft rows 1 to 6 in the block 29, while the rows of jet tubes from front to back of the wing are lettered $a$ to $j$ corresponding with the rows of apertures from back to front in the block 29. There will be corresponding rows of jet tubes 7 to 12 in the other wing in the respective transverse rows $a$ to $j$, as is obvious. The object of the crossing over of the pipes 32 is to enable the pilot to effect the customary fore-and-aft movement of the control wheel for controlling the elevation of the plane fore-and-aft. The control is effected from a handwheel 33 connected to the cylinder 27 by a rod 34 guided in a suitable gland at 35 in the back of the chamber 25.

In order to ensure that as the cylinder 27 is moved backwards and forwards it will tend to cut out or cut in the transverse rows of apertures $a$, $b$, $c$ and so forth one row at a time, an internally grooved drum 36 is provided, with which will engage balls 37 pressed outwardly by springs in a cross piece 38 secured to the shaft 34. No matter in what angular position the shaft may be, the balls 37 engaging in grooves in the drum 36 will tend to hold the cylinder 27 in one of eleven possible positions fore-and-aft. The cylinder is shown in its mid-position with the apertures in all of the transverse rows $a$ to $j$ exposed. On pushing it forward a step at a time, by pressing inwards the handwheel 33 and the shaft 34, all the apertures in the row $a$, then the row $b$ and so on can be cut out up to the row $e$, for the purpose of cutting off the supply of gas under pressure to the correspondingly numbered jet tubes on the upper surface of the wings 31 to control the elevation of the plane in flight. Drawing back the handwheel 33 and the cylinder 27 from the position shown similarly causes all the apertures in the transverse rows $j$, $i$, $h$ etc. back to $f$ if required to be covered successively to cut off the supply of gas under pressure to the jet tubes in the rows similarly numbered on the wings. It will be evident that as the jet tubes in the row $a$ are cut off the lift on the front of the wings will be reduced and the plane will tend to dive or pitch downwardly, and the pitch can be increased by cutting off the apertures in the row $b$, $c$, etc., as may be required. Similarly, for climbing the apertures in the row $j$ and if necessary the rows $i$, $h$. etc. leading to the corresponding jet tubes in the rear edge of the wings can be cut off to reduce the lift at the rear as compared with the front and so to cause the plane to climb.

In the above description and in the accompanying drawings it has been implied for simplicity that the position of the centre of gravity of the aircraft in plan view lies between the vertical planes containing the effective lift components exerted by rows $c$ and $f$, thus giving an equal number of transverse rows of jet tubes whose discharging gases give a clockwise or anticlockwise turning movement of the aircraft about its centre of gravity in side elevation. It should be noted, however, that the effective neutral point for the fore-and-aft control is determined by the relative arrangement of the jet tubes on the wings and the actual position at any moment of the centre of gravity of the aircraft, and the number of rows of jet tubes connected either side of the neutral control point may be unequal.

The cylinder 27 can also be turned transversely to cut off any of the apertures in the rows 1, 2, 3 etc. or 12, 11, 10 etc. depending on the direction in which it is turned by the handwheel 33. The effect is to cut out the apertures in fore-and-aft rows 1, 2, 3 or 12, 11, 10 etc. and the corresponding jet tubes on the wings so as to vary the lateral inclination of the plane and to cause it to bank towards the right or left as required.

The drum 36 may be conveniently mounted on brackets 39 at the rear of the chamber 25 and it may carry a guide 40 for the shaft 34 at the rear. This guide turns in ball bearings 41 in the end of the drum 36, and the shaft 34 has a key 42 which is a sliding fit in the guide 40 but keys the cross piece 38 securely to the shaft. Thus, as the shaft is turned it turns with it the cross piece 38 and the guide 40, but when the shaft is moved longitudinally only the cross piece 38 moves with it. The guide 40 is formed with a bracket carrying an arm 43 which may act as a pointer to show the angular position of the cylinder 27, and which has a rounded projection 44 adapted to engage in any one of a series of shallow recesses in the plate 45 to locate the cylinder 27 in its angular positions in relation to the rows 1, 2, 3 etc. of apertures as the cylinder is turned to cut off or expose these rows.

It will be evident that the handwheel 33 can be both turned and moved longitudinally to effect simultaneous control of the passages leading to the jet tubes on the wings to cut off say one or more rows of the passages leading to jet tubes near the wing tip and one or more rows of the passages extending across the wings near the front or the back for simultaneous control of lateral and longitudinal stability as well as for turning movements so that the requisite manoeuvres in flight can be effected by the manipulation of a single handwheel.

In order to control the pressure of the gas supply to the jet tubes on the wings it is convenient to provide cylindrical cocks 46 in the block 29, each cock having passages through it which in one position register with the holes in one of the rows 1, 2, 3. By turning a cock 46 the apertures in its corresponding row can be more or less obstructed or cut off at any time. What is desired however generally is to control all the apertures simultaneously, and for this purpose the stems of the cocks are provided with pinions 47 gearing with a transverse sliding rack 48. It then suffices to extend the rod of one of the cocks as seen in Figure 4 to pass through the plate 45, and to provide it with a handle 50 at the front by which all the cocks can be controlled simultaneously. Of course any other convenient linkage or control may be provided for the cocks, and this is only indicated by way of example. Slide valves could be used instead of turning cocks for control purposes, but then the apertures would have to be spaced further apart fore-and-aft in order to provide sufficient room between the apertures for the passages in the valve members to move under the solid metal as the cocks were pushed back and forth.

The pipes 32, which are preferably lagged to retain the heat of the gases, lead to the jet tubes in the wings, being disposed conveniently in the wings to avoid obstructions such as fuel tanks, guns and so forth. Each pipe communicates at its end with a pair of the slotted tube lengths in the surface of the wing. A suitable arrangement for this purpose is shown in Figures 8, 9 and 10. The end of each pipe 32 is fitted into a socket in a T-shaped coupler 52, and the branches of this coupler receive collars 53 into which the ends of the D-shaped tubes 55 are fitted, with the insertion of half-round plugs 54. The D-shaped tubes 55 are surrounded with lagging 56 and are set in shallow depressions in the surfaces of the aeroplane wings as indicated in Figure 10. Each D-shaped tube 55 is made by bending sheet metal so as to leave projecting lips 57 and 58, the gap between which can be adjusted accurately by set screws 59. The gap forms the slit through which the pressure gas escapes in the form a "sheet-jet" and the gas is directed over the wing surface by the curvature of the lip 57 which extends rearwardly over this surface. The collars 53 should preferably be screwed into the couplers 52 so that the D-shaped tubes may be adjusted to any angular positions, permitting any desired setting of the sheet-jets in relation to the wing surfaces. When lagged tubes are used, the heat of the gases is retained, and they are effective to hinder or prevent ice formation on the surfaces to which the gases have access.

In Figure 2 the ten jet tubes in the rows $a$ to $j$ are shown on the top surface of the wing, and additional rows of jet tubes $l$ and $m$ are indicated in dotted lines on the undersurface of the wing under the leading and trailing edges. The arrangement of the jet tubes on the undersurface of the wings is optional and is used to reduce the resistance to the forward movement of the wings through the air, and if required also as an auxiliary for manœuvring.

Similarly the tailplanes 13 are shown as having jet tubes $n$ and $o$ in their upper and lower surfaces which may assist in forward propulsion, but whose particular function is to reduce resistance to the motion of the tailplanes through the air. In Figure 1 the positions of the jet tubes $n$ and $o$ are indicated by the full lines and the dotted lines respectively on the upper and lower surfaces of the tailplanes 13, with lines 60 representing pipes leading to control cocks 61 which may be carried at either side of the brackets 39 on the control chamber. In normal flight all the cocks 61 may be open, but one or more of them may be closed with a view to assisting in the manœuvring.

It has been assumed that the whole control of the aeroplane is effected in flight by the control of the gas supply to the jet tubes on the surface of the wings and at the tail also if required, and an aeroplane with no other controls is clearly possible. However, in case of failure of the gas supply, for example through enemy action or other causes, it is desirable to provide the aeroplane with the usual flaps and rudder connected to controls in the cockpit so that the aeroplane might be landed safely in the event of failure of the power unit.

In place of the gas generator and its accessories as illustrated diagrammatically in Figure 1, any other source of gas under pressure can be used for propulsion and control of the aeroplane, for example an internal combustion engine driving a rotary compressor can be employed, the compressor delivering air or gas under pressure to the control chamber 25.

As previously stated, the jet tubes may be disposed wherever required, for example on the nose of the fuselage or at positions along it to reduce resistance and to increase the propulsive effect. The invention is also not confined to the method of control of the gas under pressure and its delivery to the various jets, as other alternative designs of this mechanism could obviously be devided. The jet tubes could be controlled in groups instead of individually. Moreover, other means for varying the pressure of the gas supplied to the jet tubes may be provided. Each jet tube may have more than one slit in its surface, but single slit tubes have been referred to throughout for simplicity of description.

I claim:

1. Aircraft having wings and a body portion, a source of gas under pressure carried by said aircraft, a plurality of jet tubes disposed in various positions distributed both fore-and-aft and transversely over substantially the entire surface of said wings, a controlling and distributing valve mechanism and pipes leading therefrom to the respective jet tubes, said controlling and distributing valve mechanism comprising a cylindrical chamber adapted to receive the gas under pressure, said chamber having a series of openings arranged relative to each other in positions corresponding to the relative positions of the jet tubes, a passage connecting each opening to the pipe leading to the jet tube that occupies a position corresponding to that of the said openings, a cylindrical valve element movable longitudinally and circumferentially in said chamber, and having a port therein adapted to expose said openings while leaving walls which can obstruct said openings in rows both longitudinally and circumferentially as said cylindrical valve element is moved longitudinally and turned within said chamber, whereby the issue of the pressure gas from said jet tubes can be controlled simultaneously in sets of said jet tubes disposed on the surface of said wings.

2. Aircraft having wings and a body portion, a source of gas under pressure carried by said aircraft, a plurality of jet tubes disposed in rows longitudinally of said wings, and one row behind another from the front toward the back of said wings, controlling valve mechanism carried by said aircraft and pipes connecting said controlling valve mechanism to said jet tubes, said controlling valve mechanism comprising a chamber receiving said pressure gas, longitudinal and transverse rows of openings in a wall of said chamber, said rows corresponding in number and arrangement to the rows of jet pipes and said openings corresponding in number to said jet pipes, a valve element adapted to slide over and obstruct rows of said openings both longitudinally and transversely as may be required, and connections between the openings of the rows beginning with the rearmost row and succeeding to the foremost row and the pipes leading to the jet tubes of the transverse rows beginning with the foremost row and succeeding to the rearmost row, and said connections extending between openings of the longitudinal rows and pipes that connect with corresponding jet tubes of the transverse rows of such jet tubes, whereby the supply of pressure gas to said jet tubes can be selectively controlled.

NORMAN ARTHUR THOMPSON.